United States Patent [19]
Bott et al.

[11] Patent Number: 5,244,944
[45] Date of Patent: Sep. 14, 1993

[54] THERMOSETTING POWDER COATING COMPOSITIONS

[75] Inventors: Lawrence L. Bott, Valdese; Max Helvey, Concord, both of N.C.

[73] Assignee: Eastman Kodak Company, Rochester, N.Y.

[21] Appl. No.: 710,500

[22] Filed: Jun. 5, 1991

[51] Int. Cl.$^5$ ............... C08K 5/19; C08L 63/00
[52] U.S. Cl. ............... 523/461; 525/533; 525/934
[58] Field of Search ............... 525/533, 934; 523/461

[56] References Cited

U.S. PATENT DOCUMENTS

| | | | |
|---|---|---|---|
| 3,347,951 | 10/1967 | Vasta | 525/119 |
| 3,758,635 | 9/1973 | Labana et al. | 260/836 |
| 3,880,946 | 4/1975 | Labana et al. | 260/830 |
| 3,880,947 | 4/1975 | Labana et al. | 260/830 |
| 3,888,943 | 6/1975 | Labana et al. | 260/836 |
| 3,914,333 | 10/1975 | Labana et al. | 260/836 |
| 3,919,345 | 11/1975 | Labana et al. | 260/830 R |
| 3,923,725 | 12/1975 | Kadotani et al. | 523/200 |
| 3,932,367 | 1/1976 | Labana et al. | 260/78.4 D |
| 3,939,127 | 2/1976 | Labana et al. | 260/78.4 D |
| 3,940,453 | 2/1976 | Labana et al. | 260/836 |
| 3,959,405 | 5/1976 | Labana et al. | 260/836 |
| 3,975,456 | 8/1976 | Labana et al. | 260/836 |
| 3,976,716 | 8/1976 | Labana et al. | 260/836 |
| 3,976,719 | 8/1976 | Labana et al. | 260/836 |
| 3,998,905 | 12/1976 | Labana et al. | 260/836 |
| 4,340,698 | 7/1982 | De Jongh et al. | 525/438 |
| 4,356,285 | 10/1982 | Kumagai | 525/934 |
| 4,359,554 | 11/1982 | Labana et al. | 525/386 |
| 4,412,065 | 10/1983 | Berge et al. | 528/21 |
| 4,659,594 | 4/1987 | Wu | 523/456 |
| 4,698,391 | 10/1987 | Yacobucci et al. | 525/162 |
| 4,889,890 | 12/1989 | Kerr et al. | 525/934 |
| 4,897,450 | 1/1990 | Craun et al. | 525/111 |
| 4,921,913 | 5/1990 | Pettit, Jr. | 525/934 |
| 4,966,928 | 10/1990 | Kitagawa et al. | 523/437 |
| 5,008,335 | 4/1991 | Pettit et al. | 525/111 |
| 5,013,791 | 5/1991 | Kerr et al. | 525/113 |
| 5,055,524 | 10/1991 | Pettit, Jr. et al. | 525/934 |

FOREIGN PATENT DOCUMENTS

| | | |
|---|---|---|
| 675510 | 2/1966 | Belgium . |
| 0010805 | 5/1980 | European Pat. Off. . |
| 0365428 | 4/1990 | European Pat. Off. . |
| 2541635 | 1/1977 | Fed. Rep. of Germany . |
| 2457884 | 12/1980 | France . |

OTHER PUBLICATIONS

"Powder Coating: Why-How-When". Journal of Paint Technology. vol. 44, No. 565, (Feb. 1972. pp. 30-37.

Primary Examiner—James J. Seidleck
Assistant Examiner—Thomas Hamilton, III
Attorney, Agent, or Firm—Bernard J. Graves, Jr.; William P. Heath, Jr.

[57] ABSTRACT

Provided are thermosetting powder coating compositions which contain a quaternary ammonium salt or hydroxide having at least one substituent of eight carbons or more and one lower alkyl group. Such quaternary ammonium salts or hydroxides were found to catalyze the curing or cross-linking reaction at lower temperatures in such compositions than previously possible.

14 Claims, No Drawings

THERMOSETTING POWDER COATING COMPOSITIONS

FIELD OF THE INVENTION

This invention belongs to the field of powder coatings. More particularly, this invention relates to a novel class of cross-linking catalysts and thermosetting powder coating compositions containing said catalysts.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems that may be occasioned by the evaporation of the solvent system. Solvent based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must possess good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

Further, research interest in powder coating compositions has shifted to lower and lower curing parameters. We have discovered a new class of cross-linking catalysts which, when utilized with certain resins and cross-linkers, effect heretofore unachievable levels of cure (i.e., cross-linking) at temperatures as low as 115° C.

SUMMARY OF THE INVENTION

The present invention provides thermosetting powder coating compositions which utilize certain quaternary ammonium salts or hydroxides as cross-linking catalysts. With this new class of cross-linking catalysts, an effective curing of the coating composition may be achieved at temperatures as low as 115° C. Thus, this invention allows for powder coatings to be applied and cured with significantly less energy expended in the case of coatings applications on metals, as well as allowing for the effective coating of various thermo-plastic or thermosetting resin compositions which would ordinarily be unsuitable for use with conventional thermosetting powder coating compositions.

DETAILED DESCRIPTION OF THE INVENTION

The present invention provides a thermosetting powder coating composition comprising
 (I) a curable polymer;
 (II) a cross-linking compound or a polymer reactive with component (I); and
 (III) a quaternary ammonium salt or hydroxide having at least one hydrocarbyl radical of at least eight carbon atoms in length and at least one lower alkyl group.

Preferably, the curable polymer component (I) is chosen from the known resins used in the powder coating art which have epoxy, carboxy, hydroxy, or anhydride functional groups which can be reacted with known cross-linking compounds to provide cured coatings.

Preferred epoxy functional resins generally have a molecular weight of about 300 to about 4000, and have approximately 0.05 to about 0.99, epoxy groups per 100 g of resin(i.e., 100-2000 weight per epoxy (WPE)). Such resins are widely known and are commercially-available under the EPON ® tradename of the Shell Chemical Company, the Araldite ® tradename of CIBA-Geigy, and D.E.R. resins of the Dow Chemical Company.

Curable polymers (I) which have carboxy functional groups include polyesters. Such polyesters preferably have a molecular weight of about 500 to about 5000 and an acid number of about 35-75. Commercially available examples of such resins include ®Alftalat AN 720, 721, 722, 744, 758, and ®Alftalat AN 9970 and 9983 resins available from Hoechst Celanese.

Curable polymers (I) which have free hydroxy groups also include the polyesters and acrylics Hydroxy-functional polyesters and acrylic polymers preferably have a hydroxyl number from about 30 to about 60 (mg KOH/g polymer).

The polyesters as described herein may be produced using well-known polycondensation procedures employing an excess of glycol (or acid) to obtain a polymer having the specified hydroxyl (or carboxyl) number. The glycol residues of the polyester component may be derived from a wide variety and number of aliphatic, alicyclic and alicyclic aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol and the like.

The dicarboxylic acid constituent of the polyesters may be derived from various aliphatic, alicyclic, aliphatic-alicyclic and aromatic dicarboxylic acids containing about 4 to 10 carbon atoms or ester-forming derivatives thereof such as dialkyl ester and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g., up to 10 mole percent, of the glycol and/or diacid residues may be replaced with branching agents, e.g., trifunctional residues derived from trimethylolethane, trimethylolpropane and trimellitic anhydride.

The preferred polyesters of the composition provided by this invention have a Tg greater than 55° C., and an inherent viscosity of about 0.15 to 0.4. The polyester component (I) preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (2) and (3), of trimethylolpropane residues. These preferred hydroxyl functional polyesters are commercially available, e.g., under the names AZS 50 Resin, Rucote 107 and Cargill Resin 3000, and/or can be prepared according to the procedures described in U.S. Pat. Nos. 3,296,211, 3,842,021, 4,124,570 and 4,264,751 incorporated herein by reference, and Published Japanese Patent Applications (Kokai) 73-05,895 and 73-26,292. The most preferred polyester consists essentially of terephthalic acid residues, 2,2-dimethyl-1,3-propanediol residues and up to 10 mole percent, based on the total moles of 2,2-dimethyl-1,3-propanediol residues, of trimethylolpropane residues, and possesses a Tg of about 50° to 65° C., a hydroxyl number of about 35 to 60, an acid number of less than 10 and an inherent viscosity of about 0.1 to 0.25.

The acrylic polymer component (I) is preferably a polymer or resin prepared by polymerization of a hydroxyl-bearing monomer such as hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxylbutyl methacrylate and the like optionally polymerized with other monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, styrene, vinyl acetate, and the like. The ratio of reagents and molecular weights of the resulting acrylic polymer are preferably chosen so as to give polymers with an average functionality (the number of OH groups per molecule) greater than or equal to 2. Commercially-available curable hydroxy-functional acrylic polymers include Joncryl 800, Joncryl 500, and Neocryl LE 800.

Polymeric binders (I) which have epoxy groups can also be resins comprised of residues of glycidyl methacrylate(GMA) and/or glycidyl acrylate. Such resins generally have a number average molecular weight of about 500 to about 5000, and a weight average molecular weight of about 1000 to about 10,000. In a preferred embodiment of the present invention, component (I) is a glycidyl methacrylate resin containing from about 5 to about 40 weight percent GMA residues, having a number average molecular weight of about 1000 to about 3000, and a weight average molecular weight of about 2000 to about 8000. Commercially available resins include those available from Mitsui Toatsu Chemicals, Inc., available under the tradename Almatex ® PD 6100, PD 6300, PD 7110, PD 7210, PD 7310, PD 7610, and pD 1700. Further examples of such resins include those described in U.S. Pat. Nos. 4,042,645; 4,091,024; 4,346,144; and 4,499,239; incorporated herein by reference.

The quaternary ammonium salt or hydroxide is preferably a compound of Formula (A)

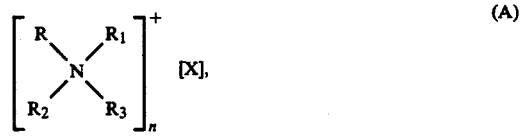

wherein R, $R_1$, $R_2$, and $R_3$ are independently $C_1$–$C_{25}$ alkyl or alkenyl or $C_1$–$C_{25}$ substituted alkyl or alkenyl or R and $R_1$ are taken together to form a 5 or 6-membered carbocyclic or heterocyclic ring, provided that at least one of R, $R_1$, $R_2$ or $R_3$ is a hydrocarbyl radical containing at least eight carbon atoms and one is a lower alkyl group; X is chloro, bromo, fluoro, hydroxide, acetate, or $SO_4^{-2}$; n is 1 when X is chloro, bromo, fluoro, hydroxide or acetate, and n is 2 when X is $SO_4^{-2}$.

In the above Formula (A), the term $C_1$–$C_{25}$ substituted alkyl is a $C_1$–$C_{25}$ alkyl group substituted by one or more hydroxy, methoxy, or quaternary ammonium groups (A) as defined above. In the latter case, the quaternary ammonium salt or hydroxide compound of Formula (A) will have 2 or more quaternary ammonium groups.

Many of the compounds of Formula (A) are commercially available from AKZO Corporation under the tradenames Arquad ®, Ethoquad ®, and Duoquad ®.

As noted above, R and $R_1$ may be taken together to form a ring system with the nitrogen atom to which they are bonded. For example, the quaternary ammonium compound of Formula (A) may be an imidazolinium compound, e.g.,

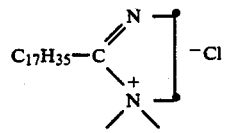

and

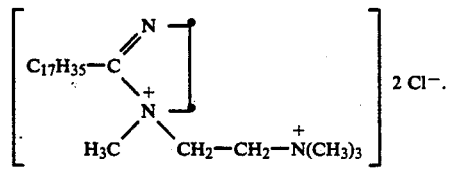

Other examples of quaternary ammonium compounds are illustrated by the following Table (1):

| R | $R_1$ | $R_2$ | $R_3$ | $X^-$ |
|---|---|---|---|---|
| methyl | ethyl | octyl | octyl | $Cl^-$ |
| ethyl | methyl | octyl | nonyl | $Cl^-$ |
| methyl | ethyl | octyl | decyl | $DI^-$ |
| methyl | methyl | octyl | nonyl | $Cl^-$ |

-continued

| R | $R_1$ | $R_2$ | $R_3$ | $X^-$ |
| --- | --- | --- | --- | --- |
| methyl | ethyl | octyl | dodecyl | $Cl^-$ |
| methyl | ethyl | decyl | decyl | $Cl^-$ |
| methyl | ethyl | octyl | octyl | $Br^-$ |
| ethyl | methyl | octyl | nonyl | $Br^-$ |
| methyl | ethyl | octyl | decyl | $Br^-$ |
| methyl | methyl | octyl | decyl | $Br^-$ |
| methyl | ethyl | octyl | nonyl | $Br^-$ |
| methyl | ethyl | octyl | dodecyl | $Br^-$ |
| methyl | ethyl | decyl | decyl | $Br^-$ |
| methyl | ethyl | octyl | octyl | $OH^-$ |
| ethyl | methyl | octyl | nonyl | $OH^-$ |
| methyl | ethyl | octyl | decyl | $OH^-$ |
| methyl | methyl | octyl | nonyl | $OH^-$ |
| methyl | ethyl | octyl | dodecyl | $OH^-$ |
| methyl | ethyl | decyl | decyl | $OH^-$ |
| methyl | methyl | dodecyl | dodecyl | $Br^-$ |
| methyl | methyl | dodecyl | dodecyl | $Cl^-$ |
| methyl | methyl | octadecyl | octadecyl | $Br^-$ |
| methyl | methyl | octadecyl | octadecyl | $Cl^-$ |

The various cross-linking compounds suitable for use in the present invention (II) are well known to one of ordinary skill in the art of powder coatings. For example, with carboxy functional resins, cross-linking compounds with epoxy groups can be utilized. Likewise, with an epoxy functional resin, an anhydride type cross-linking compound can be used. Further, with hydroxy-functional resins, blocked isocyanates can be used. As will be shown below, a carboxy functional resin may be blended with an epoxy resin and, optionally, in the presence of another epoxy functional compound such as triglicidyl isocyanurate, and cured.

Examples of anhydride type cross-linking compounds include trimellitic anhydride, benzophenone tetracarboxylic dianhydride, pyromellitic dianhydride, tetrahydrophthalic anhydride, and the like.

In general, carboxy functional cross-linking agents are $C_3$–$C_{30}$ alkyl, alkenyl, or alkynyl compounds with two or more carboxylic acid functional groups. Preferred carboxy-functional cross-linking compounds can be described by the formula $$H_2OC-[(CH_2)_n]-CO_2H,$$

wherein n is an integer of 1–10. Examples of such carboxy-functional cross-linking agents include polycarboxy alkyl compounds such as dodecanedioic acid, azeleic acid, adipic acid, 1,6-hexanedioic acid, succinic acid, pimelic acid, sebacic acid, and the like. Other examples of carboxy type cross-linking compounds include maleic acid, citric acid, itaconic acid, aconitic acid, and the like.

The blocked polyisocyanate compounds of the compositions of this invention are known compounds and can be obtained from commercial sources or may be prepared according to published procedures. Upon being heated to cure coatings of the compositions, the compounds become unblocked and the isocyanate groups react with hydroxy groups present on the amorphous polyester to cross link the polymer chains and thus cure the compositions to form tough coatings. Examples of the blocked polyisocyanate cross-linking component include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol blocked hexamethylene diisocyanate.

The most readily available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam blocked isophorone diisocyanate. may consist primarily of the blocked, difunctional, monomeric isophorone diisocyanate, i.e., a mixture of the cis and trans isomers of 3-isocyanatomethyl- 3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., normally about 150° C., and above, at which temperature the isocyanato groups are available to react with the hydroxyl groups present on the free hydroxy groups of the polyester to form urethane linkages.

Alternatively, the blocked isocyanate may be a cross-linking effective amount of an adduct of the 1,3-diazetidine-2,4-dione dimer of isophorone diisocyanate and a diol having the structure

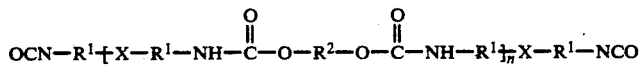

wherein
R$^1$ is a divalent 1-methylene-1,3,3-trimethyl-5-cyclohexyl radical, i.e., a radical having the structure

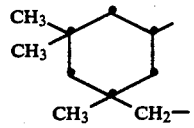

R$^2$ is a divalent aliphatic, cycloaliphatic, araliphatic or aromatic residue of a diol; and
X is a 1,3-diazetidine-2,4-dionediyl radical, i.e., a radical having the structure

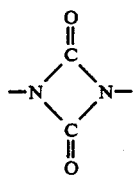

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

The amount of the blocked diisocyanate cross-linking compound present in the compositions of this invention can be varied depending on several factors such as those mentioned hereinabove relative to the amount of components (I) and (II) which are utilized. Typically, the amount of cross-linking compound which will effectively cross link the polymers to produce coatings having a good combination of properties is in the range of about 5 to 30 weight percent, preferably 15 to 25 weight percent, based on the total weight of components (I) and (II).

As a further aspect of the present invention, there is provided an improved method for curing a thermosetting coating composition, said composition comprising
(I) a curable polymer; and
(II) a cross-linking compound or a polymer reactive with component (I);
the improvement comprising
(a) contacting said composition with a quaternary ammonium salt or hydroxide having at least one hydrocarbyl radical of at least eight carbon atoms in length and one lower alkyl group to form a mixture;
(b) applying said mixture to a substrate; followed by
(c) heating said substrate to a temperature sufficient to cure the resulting coating.

As noted above, it is possible to cure some systems, namely epoxy anhydride functional, at temperatures as low as 115° C. In this regard, the criterion chosen herein to determine whether a coating has achieved a sufficient "cure" is merely whether the coating will pass a standard methyl ethyl ketone (MEK) rub test, i.e., 50 double rubs with no breakdown of the cured film. No special procedures are necessary when utilizing the compositions of the present invention or when practicing the method of the present invention other than the utilization of the quaternary ammonium salt or hydroxide catalyst.

As used herein, the term "hydrocarbyl radical" preferably refers to a hydrocarbon which is either straight or branched, optionally substituted by one or more groups and optionally containing one or more heteroatoms.

The term "lower alkyl" preferably refers to a straight or branched alkyl chain of one to six carbon atoms, most preferably an alkyl chain of one to three carbon atoms in length, i.e., methyl, ethyl, and propyl.

The powder coating compositions of this invention may be prepared from the compositions described herein by dry-mixing and then melt-blending component (I) and the cross-linking compound, the cross-linking catalyst (III), along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoiding premature cross-linking.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat resistance materials such as glass, ceramic and various metal materials. The compositions are especially useful for producing coatings on articles constructed of metals and metal alloys, particularly steel articles. As noted above, since the compositions provided by the present invention cure at a temperatures of as low as 115° C., it is also possible to coat many thermoplastic and thermosetting resin compositions with the compositions of the present invention.

Further examples of formulation methods, additives, and methods of powder coating application may be found in *User's Guide to Powder Coating*, 2nd Ed., Emery Miller, editor, Society of Manufacturing Engineers, Dearborn, (1987).

The compositions and coatings of this invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Acid and hydroxyl numbers were determined by titration and are reported herein as mg of KOH consumed for each gram of polymer. The glass transition temperatures (Tg) and the melting temperatures (Tm) were determined by differential scanning calorimetery (DSC) on the second heating cycle at a scanning rate of 20° C. per minute after the sample has been heated to melt and quenched to below the Tg of the polymer. Tg values are reported as the midpoint of the transition and Tm at peaks of transitions.

EXPERIMENTAL SECTION

In the examples which follow, the ingredients of the powder coating compositions were charged to a Henschel mixer and premixed to a uniform preblend, melt-blended in a twin screw extruder, ground to a powder in a micro-bantam mill with nitrogen assist and classified through a 200 mesh rotary screener. The particle size of the finished product thus produced had an average size of approximately 30 microns.

The powder coating compositions were subsequently applied by electrostatic spray process with a Ransburg corona type gun to 22×3.9×0.03 inch steel panels. This application process yielded films that were controlled between 1.5 and 2.0 mils.

The curing process was conducted by heating the panel with applied powder on a heated gradient oven for 5 minutes. The gradient oven is manufactured by the Byk Gardner Company (Cat. No. 2617). The 3-function option was chosen to effect cure on each panel. The objective of the test was to determine the lowest temperature at which these powder coating compositions were found to be in an adequate cured state as determined by a methyl ethyl ketone (MEK) solvent rub test.

A cotton towel soaked in MEK was attached to a 13 ounce ball peen hammer for the purpose of maintaining consistent pressure on the film when tested. The individual test was concluded with either of the following situations: (a) at less than 50 double rubs of MEK, film wears away to substrate, or (b) film withstands 50 double rubs of MEK. The following cure rating scale was used to determine whether or not films were adequately cross-linked to show cure for each temperature:

| Cure Rating | |
|---|---|
| #1 Full Cure | no surface mar and no gloss reduced. |
| #2 Full Cure | minimal mar with some gloss reduced. |
| #3 Adequate Cure | surface mar with no color transfer |
| #4 Partial Cure | film softens with 50 double rubs, with some color transfer |
| #5 Under Cure | film softens to bare metal at less than 50 double rubs. |

The powder coating compositions of this invention are further illustrated by the following examples:

| Example 1 - (Epoxy/Anhydride) | | |
|---|---|---|
| | A | B |
| Epon* 2002[1] | 1000 | 1000 |
| BTDA[2] | 170 | 170 |
| Resiflow P-67[3] | 12 | 12 |
| R03097[4] | .8 | .8 |
| YL02288[5] | .7 | 6.7 |
| R-900[6] | 229 | 229 |
| Lomicron 106[7] | 229 | 229 |
| ARQUAD* 218-100[8] | 0 | 15 |

*Registered Trademark

Curing of the above formulations in Example 1 was carried out by the aforementioned procedure and exhibited the following cure scale ratings:

| Cure Rating No. | Cure Temperature Examined, °F. | |
|---|---|---|
| | A | B |
| 5 (under cure) | 325 (30*) | 210 (10*) |
| 4 (partial cure) | 330 | 230 |
| 2 (full cure) | 350 | 250 |
| 1 (full cure) | 375 | 270 |

*No. of MEK double rubs before breaking through to substrate.

| Example 2 - (Epoxy/Amine) | | |
|---|---|---|
| | A | B |
| Epon* 2002[1] | 1000.0 | 1000.0 |
| Dicyandiamide[9] | 45.0 | 45.0 |
| Resiflow P-67[3] | 12.0 | 12.0 |
| Ult 5008[10] | 1.4 | 1.4 |
| R-900[6] | 647.0 | 647.0 |

-continued

| Example 2 - (Epoxy/Amine) | | |
|---|---|---|
| | A | B |
| ARQUAD* 218-100P[8] | — | 15.0 |

*Registered Trademark

Curing of the powder coating compositions in Example 2 was carried out as in Example 1 to determine the following cure scale ratings:

| Cure Rating No. | Cure Temperature Examined, °F. | |
|---|---|---|
| | A | B |
| 5 (under cure) | 330 (15*) | 325 (30*) |
| 4 (partial cure) | 350 (48*) | — |
| 2 (full cure) | 370 | 350 |

*No. of MEK double rubs before breaking through to substrate.

| Example 3 - (Epoxy/Polyester) | | | |
|---|---|---|---|
| | A | B | C |
| AN744[11] | 500 | 500 | 500 |
| Epon* 2002[1] | 500 | 500 | 500 |
| Resiflow P-67[3] | 12 | 12 | 12 |
| Ult 5008[10] | 1.1 | 1.1 | 1.1 |
| R-960[6] | 573.5 | 573.5 | 573.5 |
| ARQUAD* 218-100P[8] | — | 15.0 | — |
| DDAH[12] | — | — | 15.0 |

*Registered Trademark

Curing of the powder coating compositions in Example 3 was carried out as in Example 1 to determine the following cure scale ratings:

| Cure Rating No. | Cure Temperature Examined, °F. | | |
|---|---|---|---|
| | A | B | C |
| 5 (under cure) | 305 (6*) | 265 (20*) | 275 (40*) |
| 4 (partial cure) | 345 | 275 | 280 |
| 3 (adequate cure) | 375 | 290 | 305 |

*No. of MEK double rubs before breaking through to substrate.

| Example 4 - (Polyester/TGIC) | | | |
|---|---|---|---|
| | A | B | C |
| Uralac* P5000[13] | 1000 | 1000 | 1000 |
| Araldite* PT810[14] | 75 | 75 | 75 |
| Benzoin[15] | 12.9 | 12.9 | 12.9 |
| Resiflow P-67[3] | 12.9 | 12.9 | 12.9 |
| R960[6] | 618.6 | 618.6 | 618.6 |
| ARQUAD* 218-100P[8] | — | 12.9 | — |
| DDAH[12] | — | — | 12.9 |

*Registered Trademark

Curing of the powder coating compositions in Example 4 was carried out as in Example 1 to determine the following cure scale ratings:

| Cure Rating No. | Cure Temperature Examined, °F. | | |
|---|---|---|---|
| | A | B | C |
| 5 (under cure) | 305 (6*) | 265 (20*) | 265 (10*) |
| 4 (partial cure) | 345 | 275 | 275 |
| 3 (adequate cure) | 375 | 290 | 290 |
| 2 (full cure) | — | 305 | 305 |

*No. of MEK double rubs before breaking through to substrate.

| Example 5 - (Acrylic/Polycarboxylic Acid) | | | |
|---|---|---|---|
| | A | B | C |
| Almatex* PD7610[16] | 1000 | 1000 | 1000 |
| Dodecanedioic Acid[17] | 204.8 | 204.8 | 204.8 |
| EX486[18] | 18 | 18 | 18 |
| Benzoin[15] | 6 | 6 | 6 |
| ARQUAD* 218-100P[8] | — | 14.5 | — |
| DDAH[12] | — | — | 14.5 |

*Registered Trademark

Curing of the powder coating compositions in Example 5 was carried out as in Example 1 to determine the following cure scale ratings:

| Cure Rating No. | Cure Temperature Examined, °F. | | |
|---|---|---|---|
| | A | B | C |
| 5 (under cure) | 280 (25*) | 265 (45*) | 250 (30*) |
| 4 (partial cure) | 310 | 280 | 265 |
| 3 (adequate cure) | 325 | 295 | 295 |
| 2 (full cure) | — | — | 310 |
| 1 (full cure) | — | 325 | 325 |

*No. of MEK double rubs before breaking through to substrate.

| Example 6 - (Hydroxyl Polyester/Blocked Isocyanate) | | | |
|---|---|---|---|
| | A | B | C |
| Rucote* 104[19] | 1000 | 1000 | 1000 |
| Cargill 30-2400[20] | 538 | 538 | 538 |
| Araldite* GT7014[21] | 76.8 | 76.8 | 76.8 |
| Resiflow P-67[3] | 24.6 | 24.6 | 24.6 |
| BK5099 | 1.1 | 1.1 | 1.1 |
| Ult 5008[10] | 2.2 | 2.2 | 2.2 |
| Benzoin[15] | 24.6 | 24.6 | 24.6 |
| R974[22] | 5.2 | 5.2 | 5.2 |
| Zinc Stearate[23] | 1.8 | 1.8 | 1.8 |
| Irganox* 1010[24] | 3.4 | 3.4 | 3.4 |
| Premier 2090[25] | 76.8 | 76.8 | 76.8 |
| R960[6] | 828.0 | 828.0 | 828.0 |
| ARQUAD* 218-100P[8] | — | 38.8 | — |
| DDAH[12] | — | — | 38.8 |

*Registered Trademark

| Cure Rating No. | Cure Temperature Examined, °F. | | |
|---|---|---|---|
| | A | B | C |
| 5 (under cure) | 330 (10*) | 305 (8*) | 305 (42*) |
| 3 (adequate cure) | 345 | 330 | 330 |
| 2 (full cure) | 360 | 360 | 360 |

*No. of MEK double rubs before breaking through to substrate.

| Example 7 - (Carboxyl Polyester/Glycidyl Methacrylate Acrylic) | | |
|---|---|---|
| | A | B |
| Uralac* P3660[26] | 1000 | 1000 |
| Almatex* PD7610[16] | 724 | 724 |
| Dodecanedioic Acid[17] | 86.2 | 86.2 |
| Resiflow P-67[3] | 20.8 | 20.8 |
| Ult 5008[10] | .9 | .9 |
| R960[6] | 466.2 | 466.2 |
| ARQUAD* 218-100P[8] | — | 25.9 |

*Registered Trademark

Curing of the powder compositions in Example 7 was carried out in the same manner as in Example 1 to determine the following cure scale ratings:

| Cure Rating No. | Cure Temperature Examined, °F. | |
| --- | --- | --- |
| | A | B |
| 4 (partial cure) | 270 | 210 |
| 3 (adequate cure) | — | 230 |
| 2 (full cure) | 290 | 270 |

INGREDIENT REFERENCES

1) Bisphenol A Epoxy Resin—Shell Chemical
2) Benzophenone Tetracarboxylic Dianhydride—ALLCO Chemical
3) Flow Control—Estron Chemical, Inc.
4) Red Iron Oxide—Pfizer Pigments
5) Yellow Iron Oxide—Pfizer Pigments
6) Titanium Dioxide—DuPont
7) Barytes—Whittaker, Clark, and Daniels
8) Dioctadecyldimethyl Ammonium Chloride—Akzo Chemical
9) Dicyandiamide—SKW Chemicals, Inc.
10) Ultramarine Blue—Whittaker, Clark, and Daniels
11) Carboxyl Polyester—American Hoechst
12) Dioctadecyldimethyl Ammonium Hydroxide—L. L. Bott and Associates
13) Carboxyl Polyester—DSM Corp.
14) Triglycidyl Isocyanurate—CIBA GEIGY
15) Benzoin—GCA Corp.
16) Glycidyl Methacrylate Acrylic Resin—Mitsui Toatsu
17) Polycarboxylic Acid—DuPont
18) Flow Control Agent—Troy Chemical
19) Hydroxy Polyester—Ruco Polymer Corp.
20) Isophorone Diisocyanate (E-Caprolactam Blocked)—Cargill
21) Bisphenol-A Epoxy Resin—CIBA GEIGY
22) Hydrophobic Silica—Degussa Corp.
23) Zinc Stearate—Witco Corp.
24) Antioxidant—CIBA GEIGY
25) Barytes—Microminerals Inc.
26) Carboxyl Polyester Resin—DSM Resins

We claim:

1. A thermosetting powder coating composition comprising
   (I) an epoxy-functional resin having a molecular weight of about 300 to about 4000, and having approximately 0.05 to about 0.99, epoxy groups per 100 g of resin;
   (II) a carboxy or anhydride functional cross-linking compound;
   (III) a quaternary ammonium salt or hydroxide selected from the group consisting of dioctadecyldimethyl ammonium hydroxide, dioctadecyldimethyl ammonium chloride, dioctadecyldimethyl ammonium bromide, dioctadecyldiethyl ammonium hydroxide, dioctadecyldiethyl ammonium chloride, dioctadecyldipropyl ammonium hydroxide, and dioctadecyldipropyl ammonium chloride.

2. The thermosetting powder coating composition of claim 1, wherein the cross-linking compound is a $C_3$–$C_{30}$ alkyl, alkenyl, or alkynyl compound having at least two carboxylic acid groups.

3. The thermosetting powder coating composition of claim 1, wherein the cross-linking compound is selected from a list consisting of adipic acid, dodecanedioic acid, maleic acid, citric acid, sebacic acid, itaconic acid, pimelic acid, aconitic acid, succinic acid, 1,6-hexandeioic acid, and azeleic acid.

4. The thermosetting powder coating composition of claim 1, wherein the quaternary ammonium salt is dioctadecyldimethyl ammonium hyroxide or chloride.

5. A thermosetting powder coating composition comprising
   (I) an epoxy-functional acrylic polymer;
   (II) a polycarboxylic acid cross-linking compound; and
   (III) a quaternary ammonium salt or hydroxide selected from the group consisting of dioctadecyldimethyl ammonium hydroxide, dioctadecyldimethyl ammonium chloride, dioctadecyldimethyl ammonium bromide, dioctadecyldiethyl ammonium hydroxide, didodecyldiethyl ammonium chloride, dioctadecyldipropyl ammonium hydroxide, and dioctadecyldipropyl ammonium chloride.

6. The thermosetting powder coating composition of claim 5, wherein the cross-linking compound is a $C_3$–$C_{30}$ alkyl, alkenyl, or alkynyl compound having at least two carboxylic acid groups.

7. The thermosetting powder coating composition of claim 5, wherein the polycarboxylic acid cross-linking compounds have the formula $$H_2OC-[(CH_2)_n]-CO_2H,$$

wherein n is an integer of 1–10.

8. The thermosetting powder coating composition of claim 5, wherein the cross-linking compound is selected from a list consisting of adipic acid, dodecanedioic acid, maleic acid, citric acid, sebacic acid, itaconic acid, pimelic acid, aconitic acid, succinic acid, 1,6-hexanedioic acid, and azeleic acid.

9. The thermosetting powder coating composition of claim 5, wherein the acrylic resin is a glycidyl methacrylate resin having a number average molecular weight of about 500 to about 5000 and a weight average molecular weight of about 1000 to about 10,000.

10. The thermosetting powder coating composition of claim 5, wherein the quaternary ammonium salt is dioctadecyldimethyl ammonium hydroxide or chloride.

11. A shaped or formed article coated with the cured thermosetting powder coating composition of claim 1.

12. A shaped or formed article coated with the cured thermosetting powder coating composition of claim 5.

13. An improved method for curing a thermosetting coating composition, said composition comprising
    (I) an epoxy-functional resin having a molecular weight of about 300 to about 4000, and having approximately 0.05 to about 0.99, epoxy groups per 100 g of resin;
    (II) a carboxy or anhydride functional cross-linking compound;
    the improvement comprising
    (a) contacting said composition with a quaternary ammonium salt or hydroxide selected from the group consisting of dioctadecyldimethyl ammonium hydroxide, dioctadecyldimethyl ammonium chloride, dioctadecyl dimethyl ammonium bromide, dioctadecyldiethyl ammonium hydroxide, dioctadecyldiethyl ammonium chloride, dioctadecyldipropyl ammonium hydroxide, and dioctadecyldipropyl ammonium chloride, to form a mixture;

(b) applying said mixture to a substrate to form a coating; followed by
(c) heating said substrate to a temperature sufficient to cure the resulting coating.

14. An improved method for curing a thermosetting coating composition, said composition comprising
(I) an epoxy-functional acrylic polymer;
(II) a polycarboxylic acid cross-linking compound; and
the improvement comprising
(a) contacting said composition with a quaternary ammonium salt or hydroxide selected from the group consisting of dioctadecyldimethyl ammonium hydroxide, dioctadecyldimethyl ammonium chloride, dioctadecyl dimethyl ammonium bromide, dioctadecyldiethyl ammonium hydroxide, dioctadecyldiethyl ammonium chloride, di-ocatadecyldipropyl ammonium hydroxide, and dioctadecyldipropyl ammonium chloride, to form a mixture;
(b) applying said mixture to a substrate to form a coating; followed by
(c) heating said substrate to a temperature sufficient to cure the resulting coating.

* * * * *